H. HERTLE.
FEEDING AND WATERING TROUGH.
APPLICATION FILED APR. 12, 1913.

1,095,862.

Patented May 5, 1914.

Witnesses
C. C. Ardeeser.
J. W. Garner

Inventor
Henry Hertle,
By Victor J. Evans.
Attorney

COLUMBIA PLANOGRAPH CO., WASHINGTON, D. C.

UNITED STATES PATENT OFFICE.

HENRY HERTLE, OF TIPTON, INDIANA.

FEEDING AND WATERING TROUGH.

1,095,862.　　　　Specification of Letters Patent.　　Patented May 5, 1914.

Application filed April 12, 1913. Serial No. 760,729.

*To all whom it may concern:*

Be it known that I, HENRY HERTLE, a citizen of the United States, residing at Tipton, in the county of Tipton and State of Indiana, have invented new and useful Improvements in Feeding and Watering Troughs, of which the following is a specification.

This invention is an improved feeding and watering trough for animals, embodying in connection with the trough a cover pivotally mounted at one side thereof and providing bars which form spaces for the heads and muzzles of individual animals so as to prevent crowding at the trough, the invention consisting in the construction, combination and arrangement of devices hereinafter described and claimed.

Figure 1:
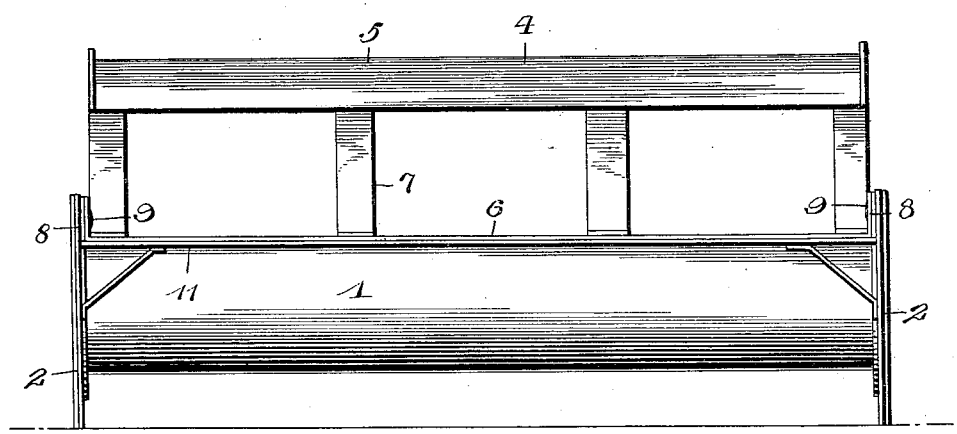
Figure 2:
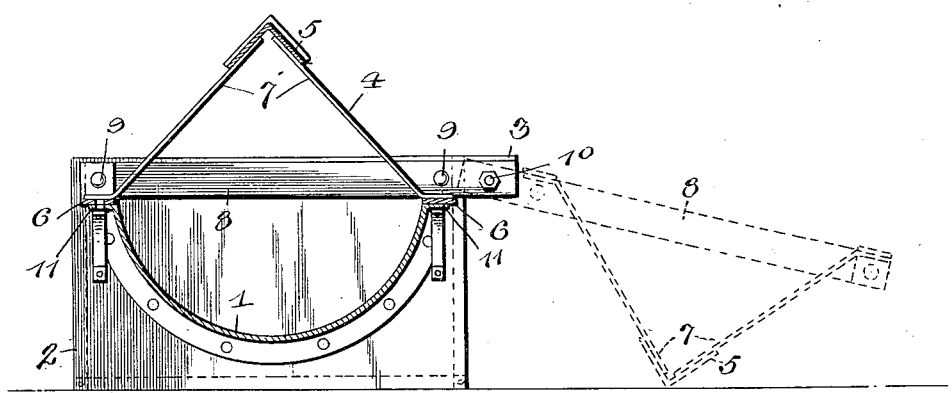
Figure 3:
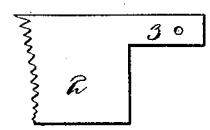

Figure 1 is a front elevation of a feeding and watering trough constructed in accordance with my invention. Fig. 2 is a vertical transverse sectional view of the same, showing the cover closed in full lines and open in dotted lines. Fig. 3 is a detail elevation showing a portion of one of the end walls.

The trough 1, which is here shown as semi-tubular in cross section, but which may be of any suitable shape and may also be of any suitable size, is provided at its ends with supporting walls 2 which extend downwardly below the trough a suitable distance and also project somewhat above the trough, these walls in addition to forming the ends of the trough, also forming supporting means therefor. Each end wall 2 is formed with an integral horizontally arranged arm 3 at one of its upper corners and which extends outwardly therefrom. I also provide a cover 4 which comprises a cross sectionally inverted V-shaped ridge piece or bar 5, a pair of side bars 6 and a series of inclined spacing bars 7 which have their lower ends secured on the upper sides of the bars 6 and their upper ends secured on the inner sides of the ridge bars 5. These bars 7 are spaced apart appropriately and form spaces between them for the heads of individual animals so that the cover when closed over the trough affords each animal which has access thereto sufficient space and prevents crowding. At the ends of the cover are cross bars 8 which are secured to upturned ends of the side bars 6 as at 9. The bars 8 are pivotally mounted at one end, between the arms 3 of the end walls 2 of the trough by means of pivot bolts 10. This construction enables the cover to be arranged over the top of the trough or to be opened outwardly and disposed at one side of the trough as may be desired. When the cover is closed, its cross bars 8, which are at its lower side, at its ends, bear on the outturned flanges 11 at the upper edges of the side walls of the trough against the inner sides of the upper portions of the end walls 2. The side bars 6 of the cover, also, when the cover is closed, bear on the said flanges 11 of the side walls of the trough.

While I have herein shown and described a preferred form of my invention, I would have it understood that changes may be made in the form, proportion and construction of the several parts without departing from the spirit of my invention and within the scope of the appended claim.

I claim:—

A trough having end walls extending about the trough and also projecting from one side thereof, and a cover to fit on the trough between the end walls thereof, the said cover comprising side bars to bear upon the upper edges of the side walls of the trough, said side bars having up-turned ends, and cross bars secured to the up-turned ends of the side bars, connecting the latter together arranged between the upper extensions of the end walls of the trough and pivotally connected to the laterally extended portions of said end walls, the cover also having a ridge piece and spacing bars secured to the ridge piece and to the side bars.

In testimony whereof I affix my signature in presence of two witnesses.

HENRY HERTLE.

Witnesses:
　WILLIAM H. KREAUSE,
　FERDINAND J. FRALICH.

---

Copies of this patent may be obtained for five cents each, by addressing the "Commissioner of Patents, Washington, D. C."